United States Patent [19]

Kuhar

[11] Patent Number: 5,482,100
[45] Date of Patent: Jan. 9, 1996

[54] CORDLESS, BALANCED VENETIAN BLIND OR SHADE WITH CONSISTENT VARIABLE FORCE SPRING MOTOR

[75] Inventor: Otto Kuhar, Garfield, N.J.

[73] Assignee: Newell Operating Company, Freeport, Ill.

[21] Appl. No.: 223,989

[22] Filed: Apr. 6, 1994

[51] Int. Cl.$^6$ .......................................... E06B 9/30
[52] U.S. Cl. ........................... 160/170; 160/192; 185/39; 185/45
[58] Field of Search ................. 160/168.1 R, 170 R, 160/171 R, 172 R, 84.02, 84.04, 84.06, 191, 193, 192; 267/155, 156; 185/37, 39, 45

[56] References Cited

U.S. PATENT DOCUMENTS

| | | |
|---|---|---|
| 13,251 | 7/1855 | Bixler . |
| 2,266,160 | 12/1941 | Burns . |
| 2,276,716 | 3/1942 | Cardona . |
| 2,324,536 | 7/1943 | Pratt . |
| 2,390,826 | 12/1945 | Cohn . |
| 2,420,301 | 5/1947 | Cusumano . |
| 2,687,769 | 8/1954 | Gershuny ........................ 160/170 R |
| 2,824,608 | 2/1958 | Etten . |
| 3,194,343 | 7/1965 | Sindlinger ........................ 185/39 X |
| 3,358,612 | 12/1967 | Bleuer ............................. 267/156 X |
| 3,756,585 | 9/1973 | Mihalcheon ..................... 267/156 |
| 5,133,399 | 7/1992 | Hiller et al. ................. 160/170 R X |
| 5,157,808 | 10/1992 | Sterner ........................... 267/156 X |
| 5,170,830 | 12/1992 | Coslett ........................... 160/84.04 |
| 5,363,898 | 11/1994 | Sprague ......................... 160/191 X |

*Primary Examiner*—David M. Purol
*Attorney, Agent, or Firm*—Foley & Lardner

[57] ABSTRACT

A cordless, balanced venetian blind or shade with a constant variable spring motor includes conventional window covering components without the outside hanging lifting cords or cord locking mechanisms. One or more constant variable force spring motors are employed, preferably comprising springs which vary in thickness or in width along their length as they are wound around storage drums. A cord spool, in the preferred embodiment, is coupled to one of the spring drums to serve to wind the cords to cause the blind to be raised or lowered, simply by manipulation of the bottom bar of the blind system. Due to the difference in thickness or width of the spring, the system compensates for the increasing weight on the cords as the window covering is raised and for the decreasing weight as it is lowered.

19 Claims, 2 Drawing Sheets

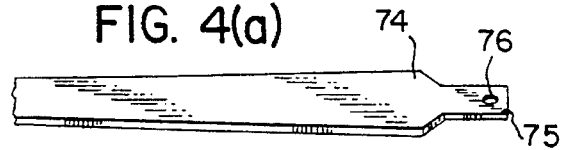
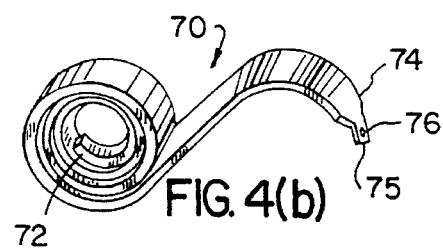
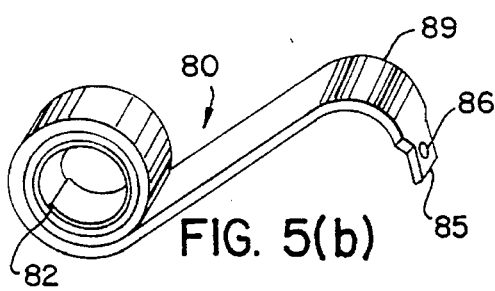
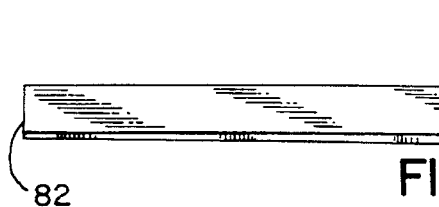
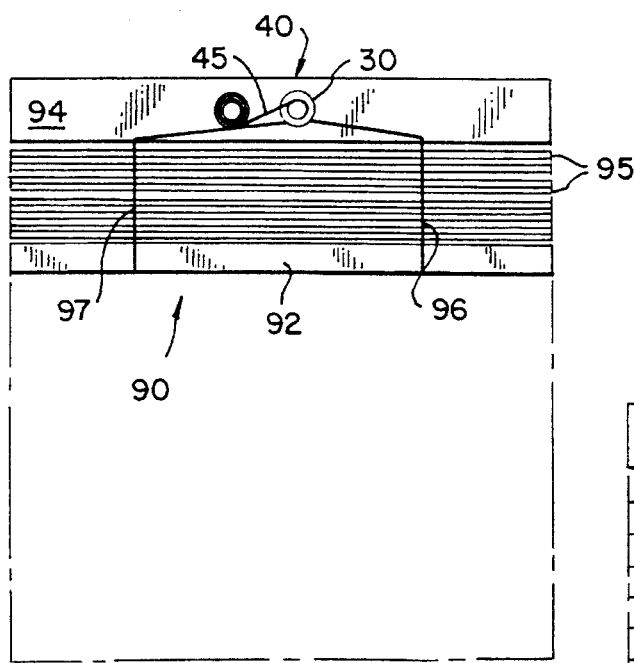
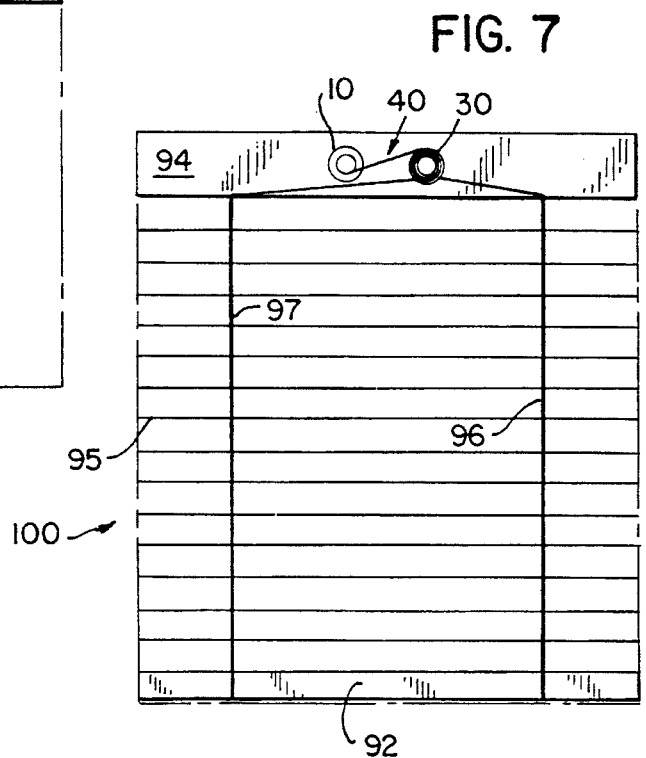

CORDLESS, BALANCED VENETIAN BLIND OR SHADE WITH CONSISTENT VARIABLE FORCE SPRING MOTOR

BACKGROUND OF THE INVENTION

1. Field of the Invention

The present invention relates generally to the art of venetian blinds and window shades, and more specifically to a system in which lifting cords and cord locking mechanisms are eliminated. Still more specifically, the invention relates to window covering systems which employ one or more consistent, variable force springs to continuously compensate for the weight of accumulated window covering material, depending upon the extent to which the blind or shade is raised or lowered.

2. Description of the Prior Art

Venetian blinds have been known for many years and typically include a plurality of slats made from metal, wood or other materials and supported by spaced apart ladders. Such blinds typically include a bottom bar and a tilt mechanism to cause the slats to move from a horizontal position to a nearly vertical position to open and close the blinds with respect to the passage of light. It is also conventional with such systems to use lifting cords coupled to the bottom bar, passing through the slats and into mechanisms within the blind headrail. The cord is used to raise the bottom bar, accumulating individual slats as the bar is raised. Because of the natural tendency of the bar and accumulated slat weight to free fall, locking mechanisms are also commonly employed with such prior art devices.

Several attempts have been made to eliminate the lifting cord locks, some of such attempts going back nearly 140 years, i.e., Bixler, U.S. Pat. No. 13,251, issued Jul. 17, 1855 for "Inside Blinds." In this device, a pair of "fusees" are employed, namely spirally grooved pulleys, to wind the lifting cord. The two fusees are arranged so that as a spring is being wound about a wider diameter portion of one, it is being unwound from a smaller diameter portion of the other, with a spool provided for accumulation of the lifting cord.

U.S. Pat. No. 2,420,301, issued May 13, 1947 to Cusumano for "Venetian Blind" also employs a cone-shaped member with grooves and an elongate coil spring. This design dispenses with normal draw cords and provides a counterbalance so that the slats may be retained at any vertical position without a lock or anchorage and so that the blinds can be raised with relatively small effort.

A different device is shown in Pratt's U.S. Pat. No. 2,324,536 issued Jul. 20, 1943 for "Closure Structure." In this device, tapes and coil springs are employed to raise and lower a blind particularly suited for use in a vehicle such as a train. The complex structure disclosed in this patent is especially suitable for devices in which the bottom bar and the slats ride in tracks as they move upwardly and downwardly.

Other patents show various spring devices used with venetian blinds. For example, in Cohn's U.S. Pat. No. 2,390,826, issued Dec. 11, 1945 for "Cordless Venetian Blinds," two coil springs are used to provide even force, with a centrifugal pawl stop. The blind is raised by freeing the pawl to allow the spring to provide a lift assist. Other more conventional systems employing springs and ratchet and pawl mechanisms include those shown in Etten's U.S. Pat. No. 2,824,608, issued Feb. 25, 1958 for "Venetian Blind"; U.S. Pat. No. 2,266,160, issued Dec. 16, 1941 to Burns for "Spring Actuated Blind"; and U.S. Pat. No. 2,276,716, issued Mar. 17, 1942 to Cardona for "Venetian Blind."

None of the aforementioned patents disclose the use of consistent variable force springs to eliminate the conventional pull cords and locks of venetian blinds in a simple and easily adaptable mechanism having few components parts. Similar problems also exist in the window shade field. A system which overcomes the disadvantages of the more complex and cumbersome systems of the prior art would represent a significant advance in this art.

SUMMARY OF THE INVENTION

The present invention features a cordless blind or shade in which a consistent variable force spring is used to eliminate conventional pull cord and cord-lock mechanisms.

The present invention also features a system in which either the spring strength or the number of variable force spring motors may be altered, depending upon the size of the window covering. The invention further features techniques for increasing the friction on the cords used to raise and lower the blinds or shade to assist in maintaining a desired position against any spring force which may exist through the range of travel of the bottom bar.

The present invention still further features a system which is easy to adapt to a wide variety of blind or shade designs and sizes and the capability of applying spring forces in a variety of ways and combinations.

How the present invention accomplishes these features will be described in the following detailed description of the most preferred embodiment, taken in conjunction with the FIGURES which illustrate blind systems, although shade applications are also enhanced by the present invention. Generally, however, the features are accomplished by employing consistent variable force spring motors in a conventional blind or shade system, while eliminating conventional pull cord and associated cord-lock mechanisms. The features are accomplished by using springs wound on drums, the springs varying in width, thickness, or both along their length, whereby when the spring force imparted to a coiled spring is transferred from one drum to another, the force is proportional to the amount of rotation, thereby providing a consistent variable force. Such force is at its highest level when the blind or shade is fully raised, i.e., when the cords are supporting the full weight of the window covering. The spring force is at its lowest point when the window covering is fully lowered and, in the case of blinds, the slats are being individually supported by ladders, rather than by the cords, leaving only the bottom bar to be supported by the cord. The blinds and shades of the present invention may be manipulated by the operator simply grasping the bottom bar and urging it in an upward or downward direction.

The features of the present invention are also accomplished by providing selection criteria for the springs, to take into account the size and weight of a particular blind or shade or by adding additional spring motors for heavier or wider window coverings. To achieve greater certainty in maintaining desirable spring forces, in a most preferred, alternate form of the invention, the spring motors are interconnected to ensure that they operate in unison to provide a level action throughout the range of blind or shade travel. All of these features are accomplished in a blind or shade which will remain in the position selected by the user. In the preferred embodiments, friction imparting devices are, if necessary, used with the cords coupling the bottom bar and a spool within the headrail.

Other features of the invention, and other ways in which those features are accomplished, will become apparent to those skilled in the art after the detailed description of the most preferred embodiment is read and understood. Such other ways are deemed to fall within the scope of the invention.

DESCRIPTION OF THE DRAWINGS

FIG. 4(a) is a perspective view of a strip of spring material varying in width along its length;

FIG. 4(b) is a schematic view of the spring shown in FIG. 4A wound into a coil;

FIG. 5(a) is a schematic view of a spring varying in thickness along its length;

FIG. 5(b) is a view of the spring of FIG. 5A shown in a coiled position;

FIG. 6 is a schematic representation of a blind in the fully open position with the cord storage drum fully wound and a spring wound on its storage drum, the system thereby supporting the full weight of the slats and bottom bar; and FIG. 7 is a schematic illustration of the blind shown in FIG. 6, with the bottom bar in its fully lowered position and illustrating how the storage drum for the cords is substantially empty and the spring substantially transferred from its storage drum to its associated output drum.

In the various FIGURES, like reference numerals are used to indicate like components.

DETAILED DESCRIPTION OF THE PREFERRED EMBODIMENT

Before proceeding with the detailed description of the preferred embodiment, several comments should be made about the applicability and the scope of the present invention. First, while venetian-type blinds are shown in certain of the FIGURES, the types of materials from which the blinds are made or the relative widths, heights and the configuration of the headrail, bottom rail and slats may vary widely. The present invention has wide applicability to a variety of such blinds, requiring only sufficient space for the consistent variable spring force motor units to be described later herein. The present invention is also useful with window shades of various types since many shade designs also use lifting cords and would benefit from the features of this invention. Whenever blinds are mentioned herein, shades should be considered a suitable alternative.

second, while two preferred types of springs are shown, one varying in width and the other. varying in thickness, a combination of the two could be employed. Other spring configurations could also be used, in addition to those having a rectangular cross-section. For example, a spring with a round cross-section, decreasing along its length or a laminated spring could also be employed.

Figure 3:
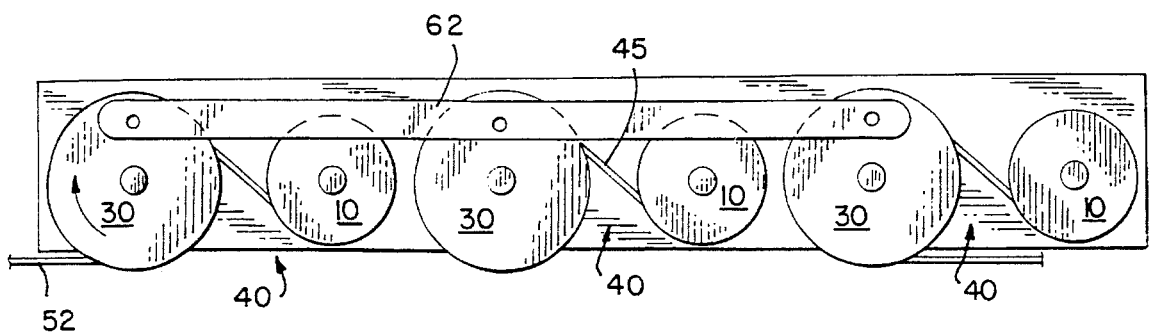
FIG. 3 is a schematic illustration of a combination of three spring motors, with the cord spools coupled together to ensure that all motors operate in unison.

Third, while one example is given of how to interconnect a plurality of spring motor units, other techniques can be employed. For example, a gear system can be employed instead of the bar. The object of illustrative FIG. 3 is to show how the drive motors can be made to operate in unison for level rising or lowering of the blind, even if the lifting forces are applied off center. Ideally, however, the user should be instructed to apply the lifting or lowering force at, or relatively near, the center of the shade to maintain desirable balance and to prevent slack from being created in the lifting cords.

Figure 1A:
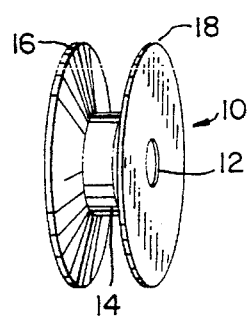
FIG. 1(a) is a perspective view of a spring storage drum useful in a preferred form of the present invention.

Proceeding now to a description of the FIGURES, FIG. 1(a) is a perspective view of one storage drum 10 useful in the preferred embodiment. Storage drum 10 includes an axial hole 12, a cylindrical spring storage area 14, and a pair of walls 16 and 18 which taper upwardly and outwardly from area 14. This particular storage drum is especially suitable for a spring which varies in width, as will be described later in this specification. Drum 10 will be referred to herein as a storage drum, i.e. the drum on which the spring is initially coiled.

Figure 1B:
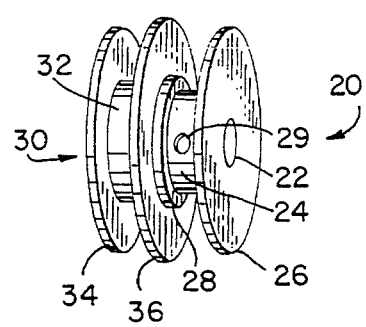
FIG. 1(b) is a perspective view of output drum, combined with a cord spool, useful in a preferred form of the present invention.

Proceeding next to FIG. 1(b), an output drum is shown generally at 20 to include an axial hole 22, a cylindrical body 24, and a pair of walls 26 and 28. A hole 29 is provided on body portion 24, the purpose of which will become apparent shortly. Output drum 20 also includes a cord spool 30 having a central aperture (not shown) coaxial with hole 22, a body portion 32, and a pair of parallel side walls 34 and 36 defining an area therebetween for storage of the lifting cords.

Figure 2:
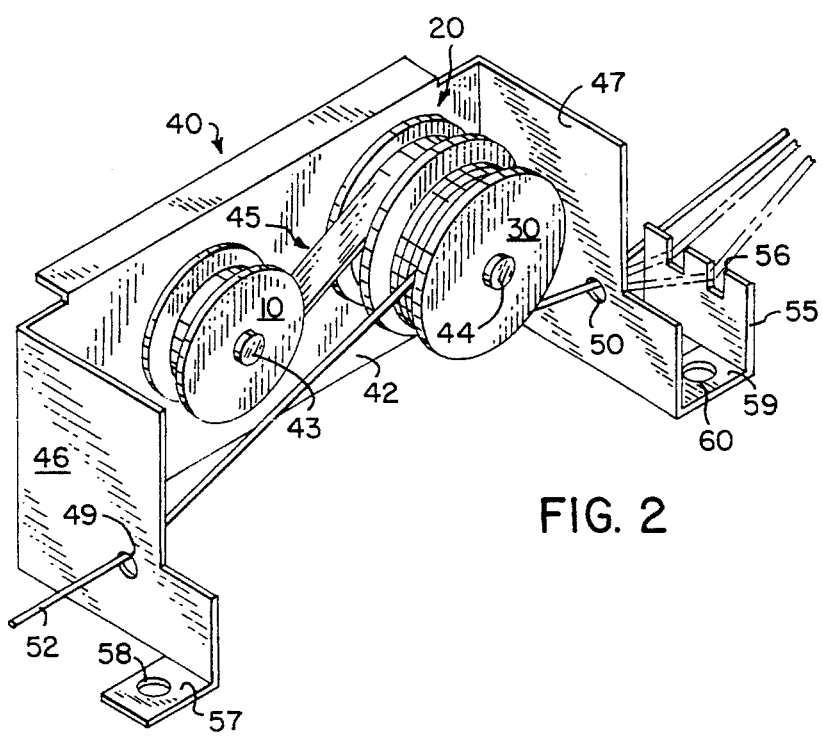
FIG. 2 is a schematic view of a spring motor together with one form of friction imparting device.

Proceeding next to FIG. 2, the arrangement of the devices in FIGS. 1(a) and 1(b) in a spring motor unit 40 is shown. Motor unit 40 includes a bracket having a planar back wall 42 onto which the storage drum 10 and output drum 20 are rotatably mounted in a spaced apart orientation. Axles 43 and 44 pass respectively through the apertures 12 and 22 of the drums 10 and 20. From FIG. 2, it will be appreciated that output drum 20 is located adjacent wall 42, with the cord spool 30 located outwardly therefrom.

A consistent variable force spring is illustrated at 45 and is coupled between storage drum 10 and output drum 20. The spring itself will be described later. The spring motor unit 40 also includes a pair of surfaces 46 and 47, which are parallel to one another and perpendicular to surface 42, defining a generally U-shaped enclosure for the two drums and the cord spool. A hole 49 is provided in surface 46 and a hole 50 is provided in surface 47, with lifting cords 52 shown passing through each toward the cord spool 30. The illustrated motor unit 40 also includes another bracket component 55 spaced apart from surface 47 and including a plurality of slots 56 in its upper edge. Solid and dashed lines illustrate how the slots 56 may be used to increase the tension on the cord 52 traveling through portion 47 toward cord spool 30.

Finally, two attachment areas 57 and 59 are shown in FIG. 2, with holes 58 and 60, respectively. The latter are used for attachment of the bracket to the blind head bracket. Obviously, the location of the mounting holes can vary widely, depending on the overall configuration of the blind with which the spring force motor unit 40 is to be used.

Before proceeding to more detailed descriptions of the springs 45, reference should now be made to FIG. 3, showing schematically how a plurality of spring motor units 40 may be coupled together, e.g. by an elongate bar 62 rotatably coupled to each of the respective cord spools 30 (or by gearing on the drums 10 and 20, not shown). It will be appreciated from this drawing, which is from a reverse perspective than that previously shown in FIG. 2, that the three spring motor units 40 will work in unison due to the coupling of bar 62. Such coupling will compensate for minor variations in spring forces which may exist for the individual springs 45 and ensure an even winding of the cords 52, even if the force to operate the blind is applied off-center.

Proceeding next to the descriptions of FIGS. 4(a) and 4(b), a spring strip 70 is shown, again in perspective form. Spring 70 includes a first narrower end 72, a second wider end 74 and a coupling extension 75 having a hole 76 therein. The illustrated spring has a constant thickness. Spring 70, in use, is wound onto the storage drum in the configuration illustrated in FIG. 4B, i.e. with its narrower end coupled to body portion 14, and its wider end toward the outside. The extension 75 is attached to the body portion 24 of output drum 20 using hole 76 and any suitable fastener. The spring is wound from one drum to the other in an opposite coil orientation. In other words, as spring 70 is transferred from the storage drum 10 to the output drum 20, the width of the spring 70 between the two drums will decrease and the spring will be wound oppositely to its original coil shape.

Another embodiment of a spring useful in the invention is shown in FIGS. 5(a) and 5(b), i.e. a spring 80 having a varying thickness. Spring 80 has a thinner first end 82, a thicker second end 89 having a width equal to that of end 82, and a coupling extension 85 having a hole 86 therein. The preferred coil orientation for spring 80 is shown in FIG. 5(b), this time with the thinner end 82 at the core of the storage drum and the thicker end 89 extending onto and around the output drum, using coupling extension 85 and hole 86. Again, the orientation of the spring, as it is transferred from the storage drum to the output drum, is reversed.

While it has been mentioned earlier that springs of different configurations may be employed, it will now be more fully appreciated that one obvious variation would be to use a spring which varies both in width and thickness. Also, a coil spring of circular cross-section or laminated spring could be employed. The diameter of the cross-section increasing from the end attached to the storage drum 10 to the end attached to the output drum 20.

Proceeding now to FIG. 6, the use of a spring motor unit 40 for a blind system 90 is shown. Blind system 90 includes a bottom bar 92, a headrail 94, and a plurality of slats 95 located therebetween. The ladders are not illustrated in these FIGURES but are conventional and, in and of themselves, do not form part of the present invention. The cords for raising and lowering bottom bar 94 are illustrated at 96 and 97 and are shown extending through the slats and toward the cord spool 30, which will be fully wound with cord when the blind is in the position illustrated in FIG. 6. Moreover, the storage drum would be wound with most of spring 45 and the output drum would be wound only to the extent desirable to attach its end and to provide the desired holding force.

Referring now to FIG. 7, the bottom bar 92 is shown in its fully lowered position with the individual slats 95 spaced from one another and with the cords 96 and 97 unwound from cord spool 30. At this point, the slats would be individually suspended from ladders (not shown) attached to the headrail 94, so that their weight is not being carried by the spring motor unit 40. It can be observed that the spring 45 has been substantially transferred from the storage drum 10 to the output drum 20, thereby decreasing the amount of force exerted on the bottom bar. In an ideal situation, the spring force will be just sufficient to prevent bottom bar 92 from self-raising.

When it is desired to open blind system 90, the bottom bar 92 is urged toward headrail 94, resulting in a spring driven rotation of the cord spool to wind cords 96 and 97. The spring will rewind back to storage drum 10, with an ever increasing level of force as the weight of the bottom bar 92 and accumulating slats 95 continues to increase. The operation is completed when the FIG. 6 configuration is achieved.

While the present invention has been described in connection with several illustrated embodiments, further variations may now be apparent. For example, instead of using only two cords (illustrated as 96 and 97 in FIGS. 6–7), additional cords could be used for stability 9 see FIG. 3).

In connection with experiments done to date, one suitable spring is made from Type 301 High-Yield Stainless Steel and has a length of 87 inches and a constant thickness of 0.005 inches. Its width increased from 0.110 inches at its narrow end to 0.312 inches at its wide end. For a coil diameter of 0.540 inches, a theoretical maximum torque of 0.650 pounds per inch was created, and the theoretical torque minimum was 0.230 pounds per inch.

In another example, a spring strip of the same length and material varied in thickness from 0.0029 inches to 0.0054 inches with the same coil diameter. The theoretical maximum torque was 0.819 pounds per inch, while the torque at the bottom (minimum) is reduced to 0.140 pounds per inch. It can be seen from these examples that the spring motor provides a variable force which is consistent in application, depending upon the particular position of the bottom rail or member with respect to the headrail. The theoretical forces may be readily calculated using formulas which are available from spring manufacturers in which the output force is determined by the formula:

$$F = \frac{E \times b \times s^3}{24 \times r^2}$$

where:

F=Output force

E=Modulus of elasticity b=Width of spring strip s=Thickness of spring strip r=Constant coil radius.

It then becomes apparent that as the width or thickness varies from end to end of the strip, so also will the resultant force.

So while the invention has been described in connection with limited illustrative examples, it is not to be limited thereby in any way but is to be limited solely by the scope of the claims which follow.

What is claimed is:

1. A window covering of the type including a top member for supporting the covering in a horizontal position and a bottom member, the window covering further including a cord means coupled to the bottom member and extending to the top member for supporting the bottom member as it is moved toward and away from the top member, wherein the covering accumulates on and is supported by the bottom member as the bottom member is moved toward the top member, the improvement comprising:

at least one consistent variable force spring drive motor being coupled to the cord means and wherein the spring drive motor comprises a coiled, elongate spring generally rectangular in cross-section which varies in width from a first end thereof to a second end thereof, wherein the spring force varies to substantially balance the combined weight of the bottom member and the covering as it accumulates on the bottom member as the bottom member is moved toward the top member, and wherein the spring force is sufficient to maintain the bottom member at any position with respect to the top member.

2. The window covering of claim 1, wherein the motor comprises a spring storage drum and a spring output drum and wherein the spring transfers from one drum onto the other as the bottom member is moved with respect to the top member.

3. The window covering of claim 2, wherein a cord storage spool is coupled to one of the drums to wind or unwind cord thereon as the bottom member is moved with respect to the top member.

4. The window covering of claim 2, wherein the spring is wound on the storage drum so that its narrower end is coupled to the storage drum and the motor is arranged to wind the wider end of the spring onto the output drum as the bottom member is moved farther away from the top member.

5. The window covering of claim 4, wherein the orientation of the spring as it is wound on the output drum is opposite to the orientation of the spring as it is wound on the storage drum, whereby its spring forces are greatest when the bottom member is near the top member.

6. The window covering of claim 1, wherein the bottom member is a bottom bar and the cord means comprises a pair of cords spaced from one another and extending to the top member.

7. The window covering of claim 1, further comprising means for imposing friction on the cord means as the bottom member is moved relative to the top member.

8. The window covering of claim 7, wherein the friction imposing means comprises a bracket for the spring motor having a plurality of passages therein through which the cord passes to adjustably increase tension on the cord.

9. The window covering of claim 1, comprising a plurality of the drive motors, the plurality of motors being coupled together to act in unison.

10. A window covering of the type including a top member for supporting the window covering in a horizontal position and a bottom member, the window covering further including a cord means coupled to the bottom member and extending to the top member for supporting the bottom member as it is moved toward and away from the top member, wherein the window covering accumulates on and is supported by the bottom member as the bottom member is moved toward the top member, the improvement comprising:

at least one consistent variable force spring drive motor for the window covering being coupled to the cord and wherein the spring drive motor comprises a coiled, elongate spring generally rectangular in cross-section which varies in thickness from a first end thereof to a second end thereof, wherein the spring force varies to substantially balance the combined weight of the bottom member and the covering it accumulates on the bottom member as the bottom member is moved toward the top member, and wherein the spring force is sufficient to maintain the bottom member at any position with respect to the top member.

11. The window covering of claim 10, wherein the motor comprises a spring storage drum and a spring output drum and wherein the spring transfers from the storage drum onto the output drum as the bottom member is moved with respect to the top member.

12. The window covering of claim 11, wherein a cord storage spool is coupled to one of the drums to wind or unwind cord thereof as the bottom member is moved with respect to the top member.

13. The window covering of claim 11, wherein the spring is wound on the storage drum so that its thinner end is coupled to the storage drum and the motor is arranged to wind the thicker end of the spring onto the output drum as the bottom member is moved farther away from the top member.

14. The window covering of claim 13, wherein the orientation of the spring on the output drum is opposite to the orientation of the spring on the storage drum, whereby its spring forces are greatest when the bottom member is near the top member.

15. The window covering of claim 10, wherein the bottom member is a bottom bar and the cord means comprises a pair of cords spaced from one another and extending to the top member.

16. The window covering of claim 10, further comprising means for imposing friction on the cord means as the bottom member is moved relative to the top member.

17. The window covering of claim 16, wherein the friction imposing means comprises a bracket for the spring motor having a plurality of passages therein through which the cord passes to adjustably increase tension on the cord.

18. The window covering of claim 10, comprising a plurality of the drive motors, the plurality of drive motors being coupled together.

19. A window covering of the type including a top member for supporting the window covering in a horizontal position and a bottom member, the window covering further including a cord means coupled to the bottom member and extending to the top member for supporting the bottom member as it is moved toward and away from the top member, wherein the window covering accumulates on and is supported by the bottom member as the bottom member is moved toward the top member, the improvement comprising:

at least one consistent variable force spring drive motor for the window covering, said motor being coupled to the cord and wherein the spring drive motor comprises a coiled, elongate spring whose cross-section varies along its length between a first end thereof and a second end thereof, wherein the spring force varies to substantially balance the combined weight of the bottom member and the covering as it accumulates on the bottom member as the bottom member is moved toward the top member, and wherein the sprinq force is sufficient to maintain the bottom member at any position with respect to the top member.

\* \* \* \* \*